United States Patent

Su

[15] 3,652,354
[45] Mar. 28, 1972

[54] METHOD OF PREPARING LAMINATES OF FIBROUS CELLULOSIC WEBS USING ULTRASONIC ENERGY

[72] Inventor: Chen-Jen Su, Alsip, Ill.

[73] Assignee: Continental Can Company, Inc., New York, N.Y.

[22] Filed: Nov. 3, 1969

[21] Appl. No.: 873,238

[52] U.S. Cl. ..................................... 156/73, 156/580
[51] Int. Cl. ............................. B32b 31/16, B32b 31/27
[58] Field of Search ............... 106/181; 156/73, 380, 580, 156/83

[56] References Cited

UNITED STATES PATENTS 2,984,581  5/1961  Tayme ........................... 106/181 X
3,171,415  3/1968  Williamson et al. ................ 156/73

FOREIGN PATENTS OR APPLICATIONS 1,018,971  2/1966  Great Britain .................... 156/73

Primary Examiner—Benjamin A. Borchelt
Assistant Examiner—James V. Doramus
Attorney—Paul Shapiro, Joseph E. Kerwin and William A. Dittmann

[57] ABSTRACT

Laminates of cellulosic webs are prepared by contacting at least part of a surface of one of the cellulosic webs to be laminated with an aqueous solution of an inorganic metal salt complex to effect swelling of the surface, placing the swelled portion of the contacted web in overlapping contact with the surface a second web to form a laminate assembly and then subjecting the assembly to a source of ultrasonic energy to effect bonding.

13 Claims, 1 Drawing Figure

PATENTED MAR 28 1972 3,652,354
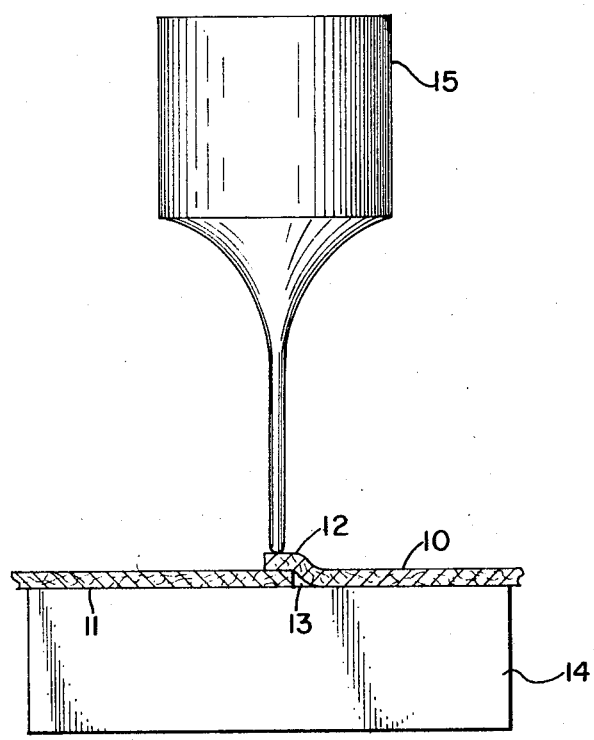
INVENTOR
CHEN-JEN SU
BY Paul Shapiro
ATT'Y.

METHOD OF PREPARING LAMINATES OF FIBROUS CELLULOSIC WEBS USING ULTRASONIC ENERGY

BACKGROUND OF THE INVENTION

1. Field of the Invention

This invention relates to laminates of fibrous cellulosic webs and to methods of making such laminates. More particularly the present invention relates to a method of joining opposed cellulosic fibrous subtrates using ultrasonic energy which is applicable for the production of paper products, such as paperboard containers, corrugated paperboard, laminated fiberboard and other paper articles.

2. The Prior Art

Fiber body containers are known in the art but have heretofore been made by methods in which comparatively thin sheets of paper fiber board are wound either spirally or convolutely to form a body including a number of plies of fiberboard. Fiber containers have been made in this manner even though it has been long recognized that methods involving either convolute or spiral winding do not lend themselves to production at speeds which have been achieved in the manufacture of metal container bodies. In contrast, container bodies secured by a simple lapped seam can be made more rapidly than the convolutely or spirally wound bodies, but heretofore the art has not been able to secure the lapped seamed portion with a bond of adequate strength to form a satisfactory lap seam body.

Also considerable difficulty has been experienced in the past by the use of the heat and pressure method of adhesively bonding an overlapped seam area due to the necessity of raising the temperature to provide for quick penetration of sufficient heat to the center of the overlapped portions to soften or cure the adhesive disposed therebetween which is required for satisfactory bonding. The wide range and rapid change of temperature between the outer and inner surfaces of the layers or plies of the fiberboard has frequently caused scorching or undesirable discoloration of the exterior surface of the fiberboard adjacent the seam.

SUMMARY OF THE INVENTION

In accordance with the present invention there is provided a method of preparing fibrous cellulosic laminates having improved bond strength which method comprises the steps of providing at least first and second cellulosic web plies, contacting at least part of a surface of at least the first cellulosic web ply with an aqueous solution of an inorganic metal salt complex for a time sufficient to effect swelling of the contacted cellulosic web surface, placing the swelled surface of the first web in overlapping contact with at least a part of the surface of the second web to form a laminate assembly and then, subjecting the laminate assembly to a source of ultrasonic energy to bond the overlapped web portions together.

The method of the present invention provides a simple and direct method of laminating cellulose fiber substrates. In the manufacture of fiberboard containers, the method of the present invention eliminates the need for a seam composed of interfolded layers in preparing the container, thereby increasing the speed of the container forming operation and reducing the total amount of paper required in the overall container construction as well as the cost thereof.

BRIEF DESCRIPTION OF THE DRAWINGS

Referring to the drawings, the FIGURE is a sectional view showing the overlapped layers of cellulosic webs and an ultrasonically activated tool in position for bonding the layers.

PREFERRED EMBODIMENTS

The term "cellulosic web" refers particularly to a web made by wet-method paper making techniques from conventional cellulosic pulps wherein there is some hydration bonding of the fibers of the web. The cellulosic web is preferably made from strong, flexible wood pulp fibers, such as bleached and unbleached fibers, ground wood, soda pulp fibers, semichemical fibers, kraft fibers, sulphite fibers, and textile fibers such as viscose rayon and cotton.

The aqueous inorganic metal salt complex solutions used to swell cellulosic web surface in the practice of the present invention are known to the art, as solvents for cellulose materials as for example U.S. Pat. No. 2,984,581 and Tappi, 44:299–304 (1961).

Illustrative examples of inorganic metal salts which may be used to prepare the inorganic metal salt complexes are the hydroxides, oxide, chloride, sulfate, nitrate salts, of metals such as the alkali metals, sodium, potassium, lithium, and nickel, cobalt, cadmium, zinc, iron, and copper.

Complexing agents which may be used to prepare the inorganic metal salt complexes include aqueous ammonia, ammonium hydroxide, ethylene diamine, tartaric acid, and allophanic acid amide

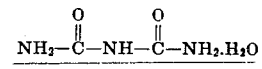

(biuret).

Specific examples of inorganic metal salt complexes useful in the practice of the present invention include cuprammonium hydroxide, nickel ammonium hydroxide, cupriethylenediamine, iron-tartrate - alkali complex salts represented by the formulae $[(C_4H_2O_6)Fe]M$ and $[(C_4H_3O_6)_3 Fe]M_6$ where M is either Na, Li, or K, metal triethylenediamine hydroxide salts having the formula $X(NH_2CH_2CH_2NH_2)_3(OH)_2$ where X is either Co, Cd, Ni or Zn, metal hydroxide-alkali-biuret complex salts represented by the formula $[G(C_2H_3O_2N_3)_2]Y_2$ where G is either Cu or Ni, and Y is either Na, Li or K.

The concentration of the inorganic metal salt complexes in the aqueous solutions used as swelling agents for the cellulosic webs in the practice of the present invention will vary according to the metal salt complex used. Generally the concentration of salt complex in the aqueous solvent will be in the range of about 10 percent to about 75 percent.

The solution of metal salt complexes are generally prepared by dissolving the required concentrations of metal salt and complexing agent in water generally at room temperature.

The required time of exposure of the cellulosic web surface to the metal salt complex solution to obtain the optimum swelling of the web required for ultrasonic bonding will depend upon several factors, as for example the particular metal salt complex used, the concentration of the metal salt complex in its solution, the thickness of the cellulosic web required to be swelled etc, all these factors will effect the proper exposure time. The exposure time should be sufficient for the cellulosic web to absorb an adequate amount of the metal salt complex to provide optimum swelling of the web surface. Ordinarily a time of at least 5 seconds will provide some swelling effect. The preferred duration of treatment for any particular set of conditions of solution and of cellulosic web surface will fall between 30 seconds and 10 minutes. This time period will cause the contacted portion of the cellulosic web to swell to about 1.5 to about 3.0 times its original thickness.

After treatment with the inorganic metal salt complex solution, the swollen cellulosic web is washed with water to remove the soluble metal complex salts which can be recovered and reused in the process.

After washing the swollen cellulose web surface to remove the inorganic metal salt complex, a laminating stratum of a second cellulose web is placed in contact with the swollen portion of the metal salt complex treated cellulosic web or first cellulosic web. The contacting portion of the second cellulosic web may be unswollen itself, or swollen by the same treatment used to effect swelling of the first cellulosic web. Bonding of the laminated assembly is then effected by applying a source of ultrasonic energy to the assembly.

The ultrasonic energy necessary to effect the bonding of the laminate assembly can be obtained from suitably activated piezoelectric or magnetostrictive transducers, air jet monowhistles, or from any other source capable of providing a frequency above 10 kilocycles/second. The frequency of the vibration is generally in the range of 20 to 100 kilocycles/second and preferably in the range of from 20 to 70 kilocycles/second, while the amplitude of vibrations is selected within the range of from approximately 0.001 to 0.025 inch.

Depending upon the type of material used as the swelling agent and the thickness of the overlapping cellulosic web layers the application of the vibratory force to the laminate assembly may extend for from less than 1 second to about 10 seconds or more, generally about 1 to 5 seconds.

In a preferred or exemplary embodiment of the invention, the drawing illustrates a method of bonding overlapped cellulosic web layers of fiber board.

The fiber board to be bonded may be in the form of relatively thin web stock, sheets, blanks prepared for article manufacture and the like and are herein designated as first and second fiber boards 10 and 11, each having end surfaces 12, 13 which have been contacted and swelled with an aqueous solution of an inorganic metal salt complex. The fiber boards 10, 11 may vary in thickness between 0.010 inch and 0.015 inch, with an average thickness of 0.011 inch. The contacting fiber board end surfaces 12, 13 after having been treated with the inorganic metal salt complex solution are generally swollen to a thickness between 0.020 to 0.025 inches.

In bonding fiber board 10 to fiber board 11 the swollen end portions 12, 13 of each board are placed in overlapping relation, and the assembly is placed on a work bed or anvil-like surface 14. A source of ultrasonic energy is applied to the overlapping fiber board assembly in any manner which will cause the end portion 12 of fiber board 10 to be pressed into contact with the end portion 13 of fiber board 11. The application of ultrasonic energy to the laminate assembly causes the end portion 12 of fiber board 10 to be pressed downwardly against the end 13 of the fiber board 11 by a downward vibratory action exerted onto the outer surfaces of the end 12 by a striker tool 15 which is activated and pressed against the fiber board end portion 12 by a source of high frequency ultrasonic energy (not shown).

Although the striker tool 15 is as shown in the drawing has a conical tip, the contacting portion of the ultrasonically activated tool can be any shape that will accommodate the laminate assembly. The tool 15 is made to vibrate at high frequency and with a minute amplitude or vibration. During the bonding operation, the tool 15 is placed against the top surface of end portion 12 and is arranged to move vertically toward the anvil 14 upon activation of the source of ultrasonic energy. In this manner, the vibrations are caused to be applied to the assembly in a direction perpendicular to the plane of the assembly. The frictional heat generated by the vibratory force induced by contact of the tool 15 with the assembly causes the rapid removal of moisture from the swollen end portions 12, 13 and effects the bonding of the assembly. Thereafter, the vibratory force is withdrawn.

During the application of the ultrasonic energy, it is desirable that a positive pressure or static force be maintained against the assembly to insure that the overlapping layers remain in contact during the ultrasonic bonding procedure. The static pressure may vary from about 5 to about 50 pounds per square inch of laminate assembly surface. Up to static pressures of about 50 p.s.i., the strength of the ultrasonically produced bond has been observed to increase with an increase in static pressure.

The invention will be more clearly understood by referring to the example which follows. It should be understood that the example is merely illustrative and should not be considered limitative of the present invention.

EXAMPLE

Kraft fiber board stock sheets having a thickness of about 0.011 inch were cut into strips of 0.5 inch width and 3.5 inch long. One end of each strip was cut into a ¼ in. × ¼ in. lap joint having a thickness of 0.011 inch. The lap joints of the liner board strips were immersed in an aqueous solution of an inorganic metal salt complex for periods ranging from 0.5 to 5.0 minutes.

The swollen lap joints obtained by the immersion in the salt complex solution were washed to remove the inorganic metal salt complex. The washed joints were overlapped to form a laminate assembly. Ultrasonic bonding of the laminate assembly was effected by placing the laminate assembly on an anvil and introducing ultrasonic energy into the top surface of the lap joint laminate assembly for 3.5 seconds using a striker tool of the type illustrated in the drawing which was excited by an ultrasonic generator operating at a frequency of about 20 kilocycles per second with a total power output from the generator of about 500 watts. The static pressure of the striker tool on the assembly was varied from 0 to 30 p.s.i.

The bond strength of the lap joints laminated by this ultrasonic technique was determined by delaminating the lap joints under a straining force imposed by an Instron machine. The straining speed was set at 0.5 inches/minute and the delaminating force, that is, the force required to separate the lap joints was measured in lbs./in.$^2$.

The delamination force required to separate the laminated fiber board lap joints which had been treated with the various inorganic metal salt complex solutions prior to ultrasonic bonding of the joints is recorded in the table below.

The inorganic metal salt complex swelling solutions listed in the table were prepared as follows:

1. Cupriethylene diamine solution: Cuene solution available commercially from Allied Chemical Company which contains 1.0M copper as copper hydroxide dissolved in 2.0M ethylene diamine.

2. Cuprammonium Solution: Blue cupric hydroxide was prepared and dissolved in 1 liter of aqueous ammonia containing 200 g. of ammonia.

3. Cu (OH)$_2$ - Biuret - NaOH Solution: A 200 ml. aqueous solution was prepared by mixing 1.154 g. blue Cu (OH)$_2$, 2.47 g. Biuret and 8.08 g. NaOH in water to obtain a complex solution having a Cu (OH)$_2$: Biuret molar ratio of 1:2 and 3.56 percent free NaOH.

4. Iron - tartrate - Sodium complex: Tartaric acid (56.85g.) was dissolved in 50 ml. distilled water by heating the solution to 40°C. Ferric nitrate monohydrate (50.86g.) was added to the tartaric acid solution. The solution was cooled to 5°C. and sodium hydroxide (66.67g.) dissolved in water (60 ml.) was added slowly to the solution. A clear green solution was obtained and was diluted to 250 ml. This solution contained 0.50 M iron, 2.0 M excess NaOH, and had an iron-tartrate mole ratio of 1:3.

5. Cadmium triethylene diamine hydroxide solution: Cadoxene A available commercially from Allied Chemical Company was comprised of 5.0 percent cadmium, 28 percent ethylene diamine and 1.5 percent sodium hydroxide.

As a control, lap joint laminations were prepared in an identical manner to that described for the example except that the lap joints were contacted with a swelling agent solution prior to ultrasonic bonding which were not aqueous solutions of inorganic metal salt complexes. These swelling agent solutions were a 72 percent solution of ZnCl$_2$ and a 50 percent NH$_3$ solution and a 75 percent NH$_3$ solution. The delamination force required to separate fiber board lap joints treated in this manner is also recorded in the table. These control runs are designated in the table by the symbol "C."

By reference to the table it is immediately apparent that ultrasonically bonded fiber board which is preswollen with an aqueous solution of an inorganic metal salt complex (run numbers 1-6) has substantially greater bond strength than an ultrasonically bonded fiber board laminate which has not been so pretreated (run numbers C$_1$ through C$_4$).

What is claimed is:

1. A method for preparing cellulosic laminates having improved bond strength which comprises the steps of:
   a. providing at least first and second uncoated cellulosic web plies;

TABLE

| Run No. | Swelling agent | Treatment time, min. | Static pressure, p.s.i. | Delamination force, lbs./in.² |
|---|---|---|---|---|
| 1 | Cupriethylene diamine | 0.5 | 0 | 145 |
| 2 | Cuprammonium | 5.0 | 0 | 191 |
| 3 | Cu(OH)₂-Biuret-NaOH | 3.0 | 0 | 189 |
| 4 | Iron-sodium-tartrate | 5.0 | 0 | 187 |
| 5 | Cadmium triethylene diamine hydroxide | 5.0 | 0 | 190 |
| 6 | ....do.... | 5.0 | 30 | 228 |
| C₁ | ZnCl₂ | 120 | 0 | 71 |
| C₂ | ZnCl₂ | 180 | 40 | 107 |
| C₃ | 50/50 NH₃/H₂O | 120 | 30 | 24 |
| C₄ | 75/25 NH₃/H₂O | 20 | 30 | 57 | b. contacting at least part of a surface of at least the first cellulosic web ply with an aqueous solution of an inorganic metal salt complex for a time sufficient to effect swelling of the contacted part of the first cellulosic web surface;

c. placing the swelled portion of the first web in overlapping contact with at least a part of the surface of the second web to form a laminate assembly and then;

d. subjecting the laminate assembly to a source of ultrasonic energy to bond the overlapped web portions together.

2. The method of claim 1 wherein the swelled part of the first cellulosic web is washed to remove the inorganic metal salt complex before the web is placed in overlapping contact with the second web.

3. The method of claim 1 wherein the portion of the second web placed in overlapping contact with the contacted portion of the first web is contacted with an aqueous solution of an inorganic metal salt complex before subjecting the assembly to a source o ultrasonic energy.

4. The method of claim 1 wherein the inorganic metal salt complex is selected from the group consisting of the Na, K, Li, Cd, Zn, Ni, Fe, Cu salts of $NH_3$, $NH_4OH$, ethylene diamine, tartaric acid, and allophanic acid.

5. The method of claim 1 wherein the inorganic metal salt complex is cupriethylene diamine.

6. The method of claim 1 wherein the inorganic metal salt complex is cuprammonium.

7. The method of claim 1 wherein the inorganic metal salt complex is an iron-tartarte-alkali complex salt represented by the formula $[(C_4H_2O_6)Fe]M$ and $[(C_4H_3O_6)_3 Fe]M_6$ where M is selected from the group of metals consisting of Na, Li and K.

8. The method of claim 1 wherein the inorganic metal salt complex is a metal triethylenediamine hydroxide salt having the formula $X(NH_2CH_2CH_2NH_2)_3 (OH)_2$ where X is a metal selected from the group consisting of Co, Cd, Ni or Zn.

9. The method of claim 1 wherein the inorganic metal salt complex is a metal-alkali-biuret complex salt having the formula $[G (C_2H_3O_2N_3)_2]Y_2$ where G is a metal selected from the group consisting of Cu and Ni, and Y is a metal selected from the group consisting of Na, Li and k.

10. The method of claim 1 wherein the ultrasonic bonding is effected by at a frequency of about 10 to 90 kilocycles operating for 1 to 10 seconds.

11. The method of claim 1 wherein the web is contacted with the inorganic salt complex solution for 0.5 to 10 minutes.

12. The method of claim 1 wherein the static pressure during ultrasonic bonding is varied from 0 to 50 p.s.i.

13. The method of claim 1 wherein the web is fiber board.

\* \* \* \* \*